350-96.24 SR

XR 3,801,776

United States Patent [19]

Goeppinger et al.

[11] 3,801,776

[45] Apr. 2, 1974

[54] OPTICAL MARK SENSE READER FOR TAB CARDS

[75] Inventors: Edward J. Goeppinger, Riverside; David E. Guthrie, Alhambra, both of Calif.

[73] Assignee: Bourns, Inc., Riverside, Calif.

[22] Filed: Dec. 26, 1972

[21] Appl. No.: 318,321

[52] U.S. Cl. ..... 235/61.11 E, 250/219 D, 350/96 B

[51] Int. Cl. .... G02b 5/16

[58] Field of Search 235/61.11 R, 61.11 E, 61.11 D, 235/61.6 E; 250/227, 219 D, 219 DC; 350/96 B

[56] References Cited

UNITED STATES PATENTS

| | | | |
|---|---|---|---|
| 3,566,083 | 2/1971 | McMillan | 235/61.11 E |
| 3,576,430 | 4/1971 | Fickenscher | 235/61.11 E |
| 3,706,874 | 12/1972 | Lockard | 235/61.11 E |
| 3,627,990 | 12/1971 | Sallach | 235/61.11 E |
| 3,628,031 | 12/1971 | Azure | 250/219 DC |

*Primary Examiner*—Thomas J. Sloyan
*Attorney, Agent, or Firm*—William G. Becker

[57] ABSTRACT

An optical mark sense tab card reader which utilizes an improved fiber optical sensing head having a plurality of elongated sensing areas, the major axis of each of which is aligned at an acute angle to the direction of travel of the tabulation card being read. This allows the card reader to efficiently and reliably read information off of tab cards where the information is presented in either slanted or the standard to vertical mark areas.

9 Claims, 8 Drawing Figures

3801776
OR IN 235/61.11E

OPTICAL MARK SENSE READER FOR TAB CARDS

BACKGROUND OF THE INVENTION

The subject invention relates to the area of tabulation card readers and, in particular, to tabulation card readers having optical sensing means.

Optical mark sense (OMS) readers for tabulation cards have existed for many years. They generally read OMS cards by the use of a brush which when it made contact with a graphite mark caused an electrically conductive signal to be made. Also, the card was required to travel through the reading mechanism along the smallest dimension of the card (from bottom to top or vice versa). Each card has a plurality of mark areas of an elongated horizontal format which are to be read. The standard tab card has 80 columns and 12 rows and, therefore, 80 brushes had to be provided, one for each column.

Also, it has been found that the use of slanted mark areas as opposed to horizontal or vertical areas allows an individual to suitably mark tab cards quicker and with greater accuracy than when horizontal or vertical marks are provided. The improved efficiency by the use of slanted mark areas has been proven to the extent that it is presently in use by telephone operators wherein information regarding such actions as non-direct dial long distance telephone calls must be provided on tab cards.

Additionally, there are advantages to the use of optical sensing means as opposed to the electrically conductive brush in that the former requires only that a somewhat opaque mark be made in the appropriate mark area which may be by conventional pencil or pen, and the latter requires the use of a special pencil having conductive graphite lead in order for proper operation.

While some card readers can read slanted mark areas, their accuracy and tolerance to incomplete marking of the desired areas is not as good as is desirable in some circumstances.

BRIEF DESCRIPTION OF THE INVENTION

Therefore, it is an object of the subject invention to provide an optical mark sense reader which is capable of efficiently and accurately reading tabulation cards;

It is a further object to provide such a reader which is capable of efficiently and effectively reading slant mark areas on tabulation cards;

Another object of the subject invention is to provide an optical card reader which is compact and inexpensive.

These objects are satisfied in the subject invention which provides an optical mark sense reader including a fiber optical sensing head having a plurality of elongated sense areas, one for each row of mark areas on a tab card to be read, with the major axis of the elongated sense areas being at an acute angle, preferably between 24° and 26°, to the direction of travel of the tab cards through the reader. Means are also provided for synchronizing the data read from the marked areas of the card to the speed of travel of the card over the optical sensing head. The structure of the subject invention allows all the data indicated in the marked areas of a card to be read and stored on a single traverse of the card through the reader.

The subject matter which is regarded as the present invention is particularly pointed out and distinctly claimed in the concluding portion of this specification.

BRIEF DESCRIPTION OF THE DRAWINGS

The present invention, however, together with further objects and advantages thereof, may best be understood by reference to the following description taken in connection with the accompanying drawings in which.

DESCRIPTION OF THE PREFERRED EMBODIMENT

Figures 1, 4, 5, 6, 7:
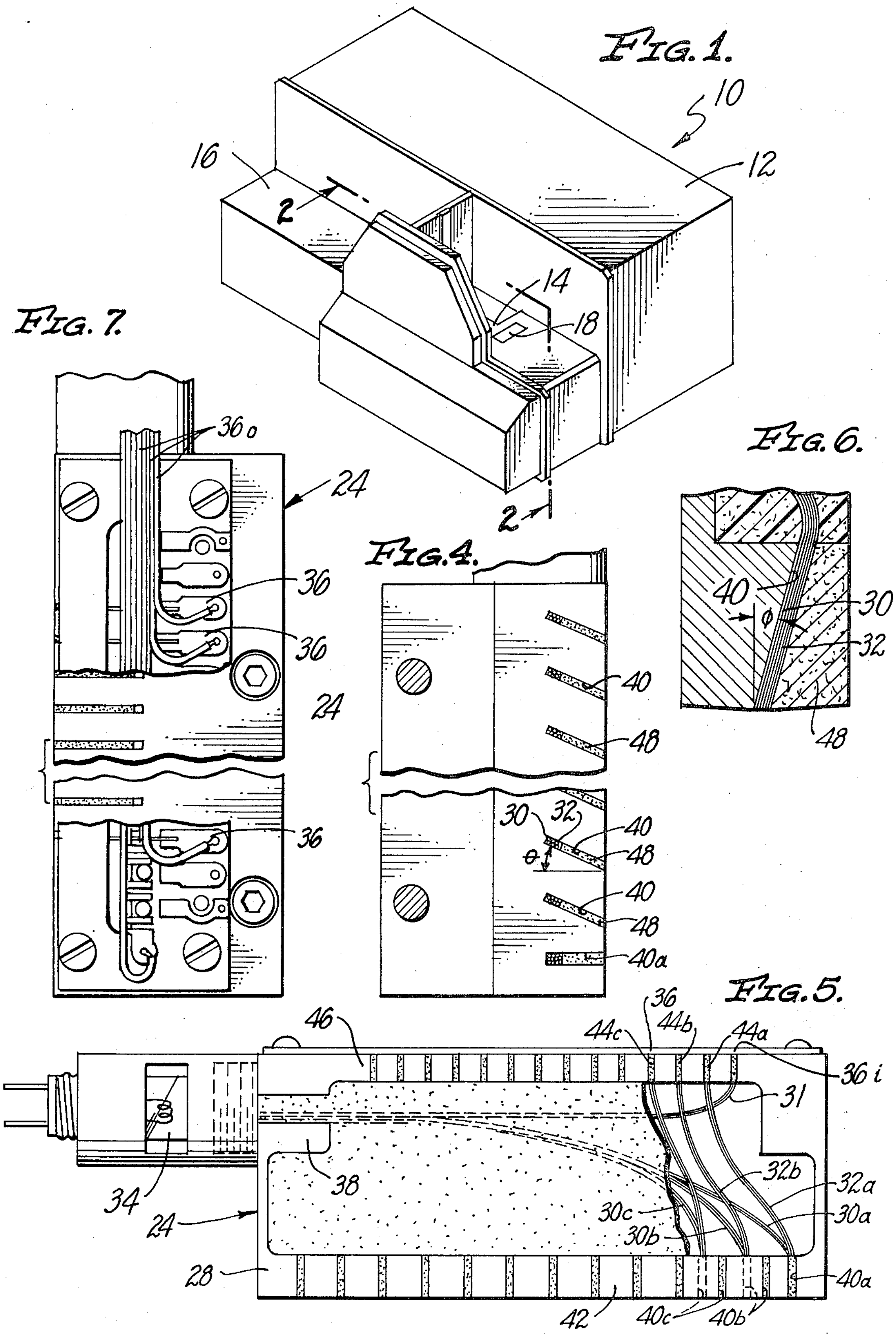
FIG. 1 is an isometric view of a card reader in accordance with the subject invention.
FIG. 4 is a side sectional view of the optical sensing head in accordance with the subject invention.
FIG. 5 is a bottom view of the optical sensing head shown in FIG. 4.
FIG. 6 is a partial sectional view of the portion of the optical sensing head shown in FIGS. 4 and 5.
FIG. 7 is a top view, partially cut away, of the optical sensing head shown in FIGS. 4–6.

In FIG. 1 an isometric view of an optical mark sense tab card reader 10 is shown. Reader 10, externally, is comprised of a cover member 12, a tab card input hopper 14 and a tab card output hopper 16.

Figure 2:
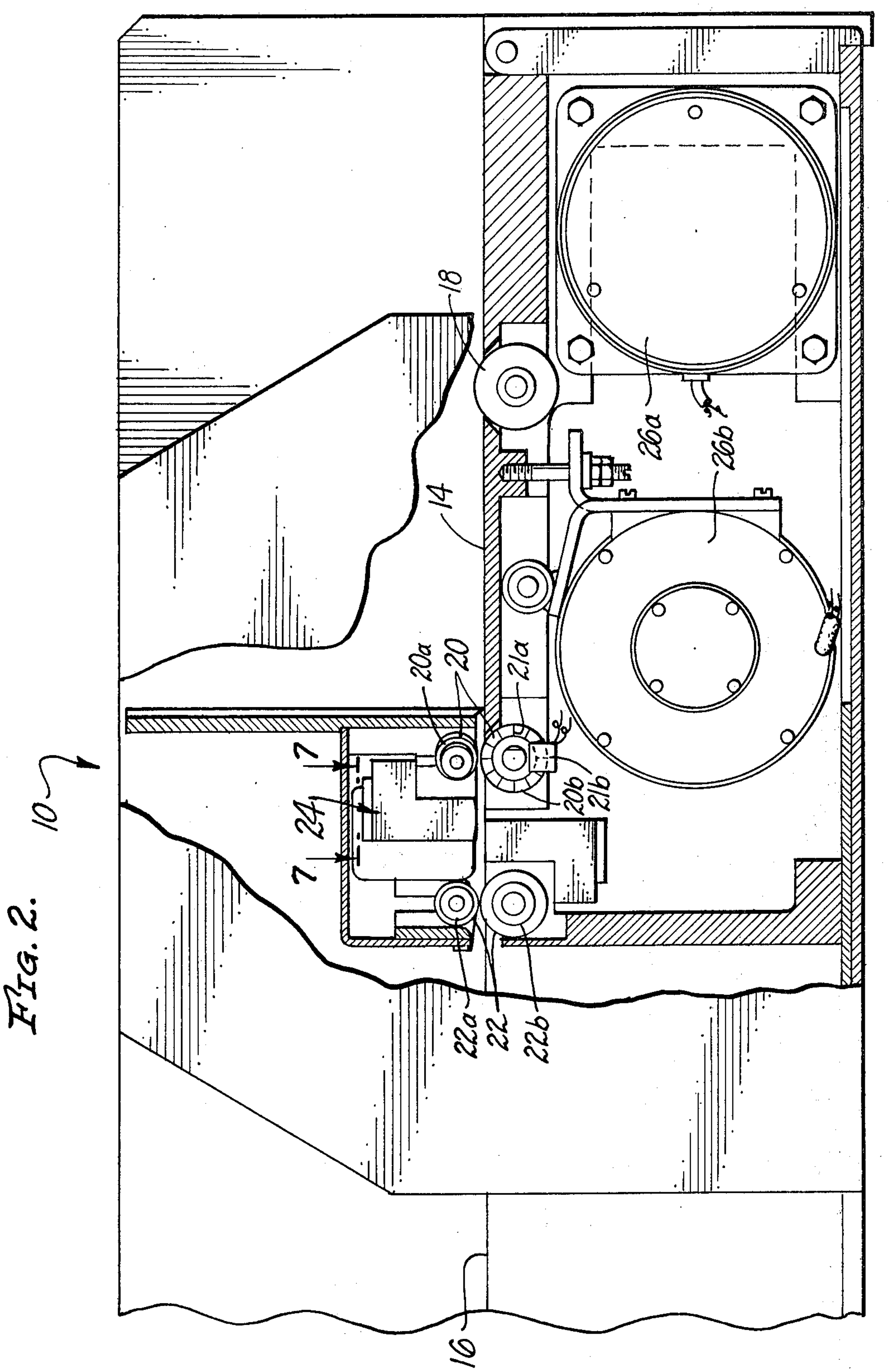
FIG. 2 is a side view, partially in section along the plane denoted 2—2, of the device shown in FIG. 1.

FIG. 2 is a partial front sectional view which shows, in part, the mechanism for transporting a card through the reader. The transport mechanism includes a feed roller 18 and two sets of drive wheels 20, 22. Each set of drive wheels is comprised of an upper idler **20*a*, 22*a* and lower driving member 20*b*, 22*b*. One set of drive wheels 20 is located ahead of optical sensing head 24 and the second set is located in back of sensing head 24. Motors 26*a*, *b* are provided for driving the feed roller and drive wheels so as to propel a tab card at a substantially constant rate of speed across the face of sensing head 24. Motor 26*a* may be a stepping motor which when actuated causes a card to be fed to drive wheels 20. Motor 26*b* is typically a synchronous motor which is kept running at a substantially constant speed. If desired, a single motor might be used with actuation of feed roller 18** being accomplished by means of a clutch type mechanism.

The card transporting mechanism may be designed so as to always transport the card across the face of the optical sensing head at a predetermined speed. This speed factor may then be permanently factored into the electronics which sense and store the information received from the tab cards. However, as a practical matter, it may be impractical or otherwise undesirable to utilize a predetermined constant rate of speed in designing the electronics. Thus it is contemplated that the card reader of the subject invention may include means for sensing the speed at which the card is being transported over the optical sensing head. An electrical output indicative of the speed would then be connected to the electronics associated with the reading of information from the cards so that the actual speed at which the card is traveling past the optical sensing head can be factored into electronics. For example, strobe marks 21*a* may be provided on wheel 20*b* and a photosensitive device 21*b* may be provided facing strobe marks 21*a* so as to give an electrical output which varies at a frequency proportional to the speed of travel of a card engaged by wheels 20. Alternatively, if the tab cards used have timing marks included thereon, a fiber optic sensor for the timing marks may be provided, as discussed in greater detail below.

The sensing head 24, which is of critical importance regarding the ability of the reader to read a variety of tab cards efficiently, is shown in FIGS. 3–7.

The sensing head 24 is basically comprised of a casing 28, a set of bunches of illuminating fiber optic strands 30, a set of bunches of sensing fiber optic strands 32, a light source 34 disposed at one end of the illuminating fiber optic strands 30 and a set of photoelectric sensors 36 for sensing light from respective sensing fiber optic strands 32 and converting this into electrical signals.

The sensing strands 30, 32 are divided up into a plurality of bundles 30*a*, *b*, *c* . . . and 32*a*, *b*, *c* . . . Each of the bundles includes a plurality of small diameter fiber optic strands. The strands are preferably made of a glass material of 1 to 2 mils diameter. A separate bunch of illuminating strands 31 is provided in order to allow the light intensity to be monitored. Clamping means 38 adjacent light source 34 is provided to clamp one end of all the illuminating strands 30, 31 together to allow light source 34 to uniformly illuminate strands 30. At the other end of strands 30, the individual bunches of strands are fixed in respecitve slots 40*a*, *b*, *c* . . . in the head surface portion 42. Each bunch of illuminating strands 30 at this end are optic strands of respective bunches of sensing strands 32 so that in each of the sensing slots 40 is a randomly mixed array of fiber optics forming elongated sensing areas (approximately 2,000 – 8,000) including both illuminating strands and sensing strands. The other end of each of the bunches of sensing strands 32 is held in respective slots 44*a*, *b*, *c* . . . in an upper portion 46 of body member 28. In these slots 44, each bundle is held adjacent a respective photosensitive member 36.

For each row of data marks on a tab card to be read (generally 12 – 14), a separate slot 40, a separate slot 44, a separate bundle of illuminating strands 30, a separate bundle of sensing strands 32 and a separate photosensitive member 36 is provided. Each of the slots 40 and hence sensing areas (with the exception of slot 40*a*) is inclined at an acute angle $\theta$, preferably between 24° and 26°, to the direction of travel of the card through the reader in a plane substantially parallel to the plane of travel of the card. This angle $\theta$ is approximately the angle of the slanted mark areas on cards to be read. For ease in manufacture of the optical sensing head, the slots are much longer than the bundles of fiber optics to be received so that an insert 48, preferably of a material such as plastic, may be inserted in the slots to hold the bundles in place. The sensing area of the bundles in each of the slots 40 is preferably of an elongated shape the dimensions of which are the same or slightly smaller than one of the individual tab card mark areas generally about 0.020 × 0.040 inch. Since the shape and orientation of each sensing area is approximately the same as that of each of the tab card mark areas, the entire field of each mark area is able to be sensed by each set of bundles to provide accurate and reliable sensing of information.

Also, it is preferred that the bundles be aligned in slots 40 at an acute angle $\phi$ in a vertical plane so as to minimize undesirable effects due to reflection of light on the tab cards. By experimentation, it has been found that this angle $\phi$ is preferably between 14° and 16°. By the use of this slant angle $\phi$, the reader of the subject invention is able to very accurately and reliably distinguish valid marks from invalid marks on tab cards even if the marks are marginal.

Figure 3:
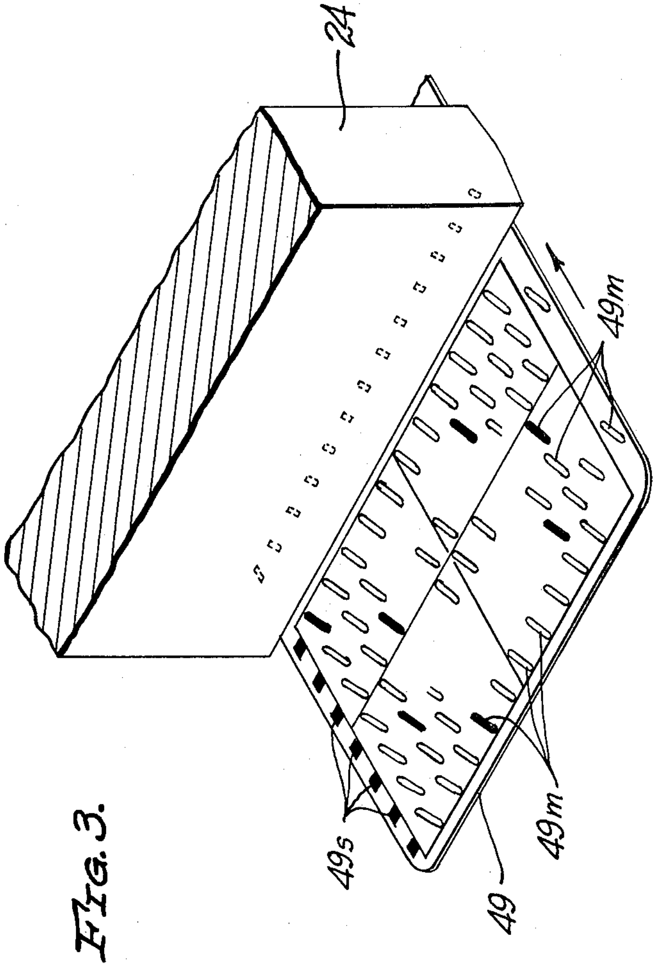
FIG. 3 is a simplified isometric view of the card reader shown in FIGS. 1 and 2 showing a tab card being read by the optical sensing head of the device.

The fiber optics 30*a*, 32*a* in slot 40*a* are aligned at an angle $\theta$ equal to zero degrees in order to have strobe marks sensed. In FIG. 3, a tab card 49 which includes strobe (timing) marks 49*s* is shown. Generally, the strobe marks are black marks of a rectnagular or square shape along one of the longitudinal edges of the card in line with the columns of information mark areas 49*m* which are to be sensed by the card reader. The alignment of the fiber optics 30*a*, 32*a* in slot 40*a* at $\theta$ equal to zero degrees is merely because the strobe marks are not slanted like the mark areas. In this example, 12 rows of mark areas 49*m* and 1 row of strobe marks 49*s* are shown.

Thus, bundles 30 are used to provide illumination on the tab cards and bundles 32 are used to pick up and transmit any light which is reflected off the surface of tab cards. Bundles 32 will transmit a substantial quantity of light if no mark has been placed on the tab card mark areas which are adjacent the sensing head and will transmit substantially no light if such a mark is blacked out. Each of the photosensitive members 36 which can conveniently be any suitable photosensitive electronic device, such as a phototransistor, generates an electric current when light from its respective bundle of sensing fiber optic strands 32 is received. If no light is transmitted through a respective bundle 32, no current is generated by the respective photosensitive member 36. Thus, each of the photosensitive members 36 provides a pulsating electrical output signal through its output lead 36*o* indicative of the presence or absence of marks in the prescribed mark areas on a tab card.

As shown in FIG. 5, an illumination intensity monitoring photosensitive device 36*i* may be employed to continuously monitor the intensity of light being transmitted through the illumination fiber optic bundles. Specifically, bundle 31 is routed to photosensitive device 36*i* to provide this function. The output of this is used to control the sensitivity of the other photosensitive devices 36 or to allow the change in light intensity to be compensated for in the electronic circuity described hereinafter.

Figure 8:
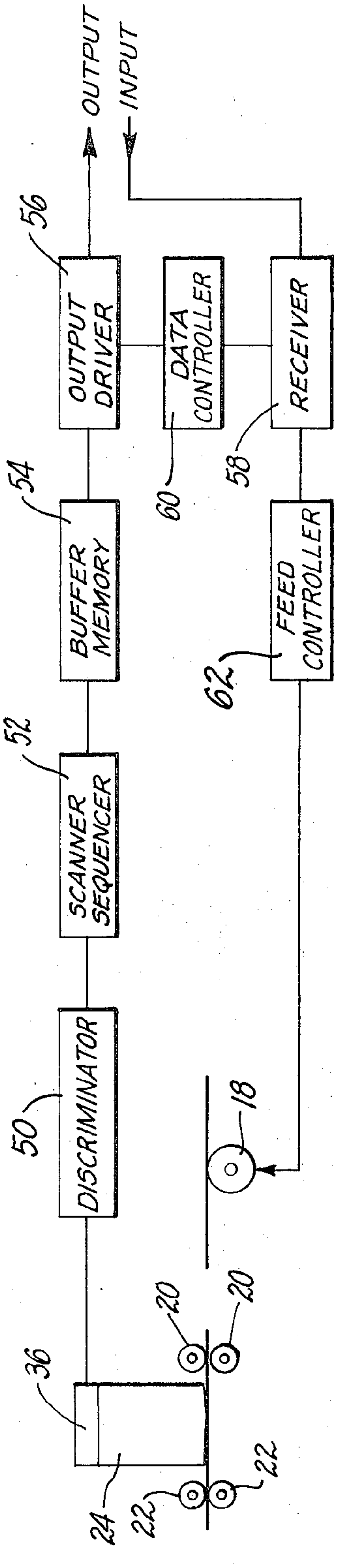
FIG. 8 is a simplified block diagram of an embodiment of data control and processing equipment of the reader in accordance with the subject invention.

As shown diagrammatically in FIG. 8, the electrical signals from photosensitive members 36 are transmitted to the electronics portion of the reader 10 where they are acted upon to provide a more useful electrical output in a manner well known in the art. Particularly, the electronics will include discriminators 50, a scanner sequencer 52, a buffer memory 54, an output driver 56, a receiver 58, a data controller 60, and a feed controller 62. The output signal from the reader may be fed to a computer or data storage device for storage or further manipulation.

The discriminators 50 are used to convert the pulsating electrical signals from the photosensitive devices to digital electrical signals which are fed to the scanner sequencer 52. Scanner sequencer 52 recognizes a code of such signals or may change the code. The scanner sequencer 52 can selectively read or block out certain preselected columns of data or portions of columns. The resultant signals are stored in the buffer memory 54. On receipt of an appropriate input signal from a computer or other control device, receiver 58 causes actuation of data controller 60 which in turn causes output driver 56 to transmit the information stored in buffer memory through the output. An input signal may also be used via receiver 58 to actuate feed controller 62 which in turn causes feed roller 18 to be actuated to feed another card to the optical sensing head 24. If desired, the reader 10 can be set to continuously feed cards as the information on the previous card is transmitted through the output. This generally would be the case if the information on the cards was merely being stored in a storage device, such as a magnetic tape unit.

In operation, a single card or deck of cards is placed in the input hopper 14. Each card is then sequentially transported through the reader, with the sensing head 24 sequentially sensing the data on the cards a column at a time as it passes under the head, as best shown in FIG. 3. Thus, all the information on a tab card can be read in a single pass. This information is optically transmitted via the fiber optic bundles 32 to the photosensitive members 36 which in turn generate electrical signals indicative of the information sensed. This information is then acted upon by the electronics in the reader to provide an output which can be stored or manipulated by a device such as a computer.

One of the unique features of the subject invention is in providing optical sensors each having an elongated sensing area, the major axis of which is aligned at an acute angle $\theta$ to the direction of travel of each of the tab cards in a plane generally parallel to the plane of travel of the cards. This allows the sensing head 24 to sense marked information which is presented on slanted mark areas on a tab card quickly and accurately.

As stated in the introduction of the specification, the use of slanted mark areas on tab cards is becoming increasingly popular due to the ease with which an individual can mark such areas. Additionally, the card reader of the subject invention can also accurately and quickly read information from tab cards where the information mark areas are vertical.

Most conventional tab card readers, such as the model 519 card reader manufactured and sold by IBM, read tab cards vertically and, therefore, require a sensing unit for each column, generally around 80. These readers are slow and expensive, but generally have been used widely. However, these readers can read either horizontal tab marks or tab marks which are slanted up to approximately 25°. As such a reader is designed to read marks having a substantial horizontal component, marks slanted at an angle of over approximately 25° cannot be accurately or reliably sensed. While the card reader of the subject invention can read cards more efficiently and accurately and is less expensive, it is recognized that prior art card readers are widely in use. Therefore, one of the advantages of the subject invention is that it can read tab cards having slanted mark areas which can also be read by a user's existing readers. This provides desirable flexibility and adaptability of the reader.

Also, many prior art card readers use electrically conductive brushes for sensing and must rely on the electrical conductivity of marks in order to sense the information contained thereon and, therefore, require the use of special pencils. Great care must be taken to assure that the mark areas are completely filled by the conductive pencil mark. However, in the subject invention, the marks or lack thereof are sensed optically, and, therefore, only a conventional lead pencil or ink is required to mark the areas. Due to the specific design of the sensing head, the reader can readily distinguish even marginal marks, i.e., those that don't completely fill a mark area. The brushes used on these readers tend to wipe away the conducting marking, and hence after repeated readings of a card, the marks become obliterated and cannot be read reliably. However, the reader of the subject invention does not obliterate a mark. Also, usually it can read most marks that have been obliterated and are not readable by many prior art readers.

While, generally, information will be provided by marking the mark areas with a black mark, it is also possible to provide information by perforating the tab card. The card reader of the subject invention can read such perforations or lack thereof in the same manner in which it reads black marks whether they be in a vertical or slanted format. If a mark area having a perforation therein is passed over the optical sensing head, light will not be reflected therefrom; and, therefore, substantially no light will be transmitted by the sensing bundles 32.

Thus, it is obvious that the card reader of the subject invention presents many advantages in flexibility, accuracy, reliability and speed of interrogation of tab cards.

It is obvious that many modifications may be made to the subject invention which come within its true scope and spirit. Thus, the scope of the subject invention is considered to be limited only by the appended claims.

What is desired to be secured by Letters Patent of the United States is:

1. An optical mark sense card reader for reading tabulation cards having a plurality of mark areas arranged in a predetermined column and row format comprised of:

a. optical sensing means for sensing the presence or absence of indicia in the mark areas and including an optical sensing head having a plurality of slots, a plurality of bunches of illuminating fiber optic strands, a plurality of bunches of sensing fiber optic strands, and a light source located against one end of said illuminating bunches; the other end of each of said illuminating bunches and the end of each associated one of said sensing bunches being fixed together in a respective one of said slots to form a respective elongated sensing area;

b. means for transporting cards across said sensing head such that said sensing areas are each aligned with a row of mark areas;

c. data generating means for providing electrical signals indicative of the presence or absence of marks in the mark areas of a card, the other ends of said sensing bunches being routed to said data generating means, wherein at least some of said sensing areas have their major axis aligned at an acute angle $\theta$ to the direction of travel of said cards in a plane generally parallel to the plane of travel of a card.

2. A reader as in claim 1 wherein said strands of each associated illuminating bunch and sensing bunch are randomly mixed in their respective slot.

3. A reader as in claim 1 wherein said angle $\theta$ is approximately 24°–26°.

4. A reader as in claim 1 wherein the portions of each of said respective illuminating and sensing bunches held in said slots are aligned at an acute angle $\phi$ in a vertical plane.

5. A reader as in claim 4 wherein said angle $\phi$ is approximately 14°–16°.

6. A reader as in claim 1 further including speed monitoring means for providing an electrical signal indicative of the speed at which a card is traveling past said sensing head.

7. A reader as in claim 6 wherein said transporting means includes at least one drive wheel which engages a card to transport it past said sensing head, said drive wheel having timing marks thereon;

and said speed monitoring means includes a relatively fixed photosensitive device facing the timing marks on said drive wheel so as to provide an electrical output signal indicative of the frequency at which the timing marks pass in front of said photosensitive device.

8. A device as in claim 1 further including means for monitoring the intensity of light transmitted through said illuminating bundles and providing an electrical signal indicative thereof.

9. A device as in claim 1 wherein said data generating means includes a plurality of photosensitive means one of which is located adjacent an end of each of said sensing bunches, for providing pulsating electrical signals indicative of the presence or absence of light transmitted through its associated sensing bunch, means for converting each of the pulsating electrical signals into digital electrical signals, means for scanning and codifying the digital electrical signals, means for storing the information in the resultant signals and means for transmitting the stored information through an output terminal.

* * * * *

UNITED STATES PATENT OFFICE

CERTIFICATE OF CORRECTION

Patent No. 3,801,776 Dated April 2, 1974

Inventor(s) Edward J. Goeppinger and David E. Guthrie

It is certified that error appears in the above-identified patent and that said Letters Patent are hereby corrected as shown below:

Column 3, Line 37, "respecitve" should read --respective--.

Column 4, Line 20, "rectnagular" should read --rectangular--.

Column 4, Line 57, "circuity" should read --circuitry--.

Column 6, Line 4, insert --card-- after "existing".

Signed and sealed this 12th day of November 1974.

(SEAL)
Attest:

McCOY M. GIBSON JR.
Attesting Officer

C. MARSHALL DANN
Commissioner of Patents